June 9, 1959 — J. M. McCORMICK — 2,890,347
COMPARING AND MEASURING VALUES BY USE OF X-RAYS
Filed Nov. 15, 1954
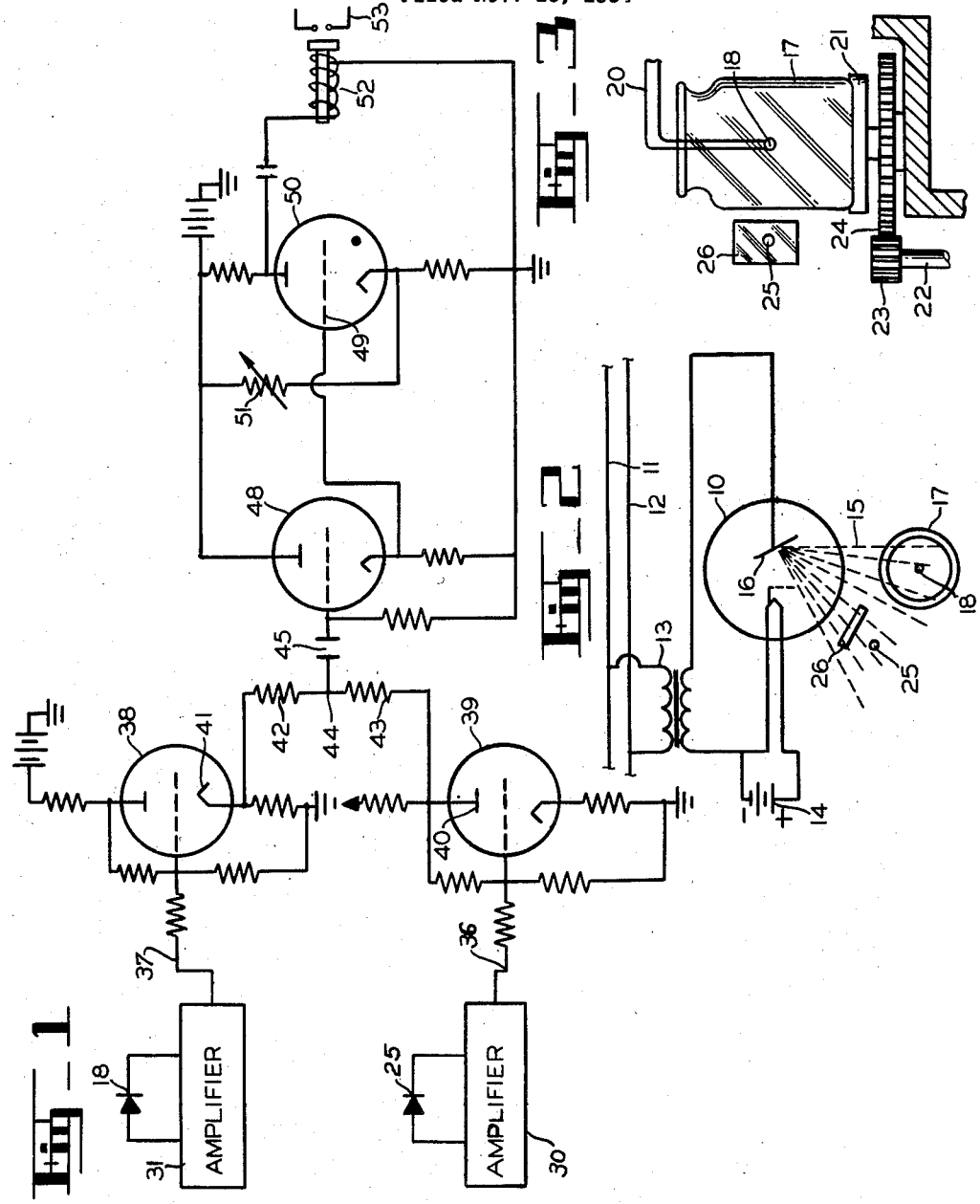
INVENTOR.
John M. McCormick
BY
Rule & Hoge
ATTORNEYS

United States Patent Office 2,890,347
Patented June 9, 1959

2,890,347

COMPARING AND MEASURING VALUES BY USE OF X-RAYS

John M. McCormick, Toledo, Ohio, assignor to Owens-Illinois Glass Company, a corporation of Ohio Application November 15, 1954, Serial No. 468,729

5 Claims. (Cl. 250—83.3)

My invention relates to the comparison and measurement of physical values of materials. It provides a novel system and method of producing and comparing electrical signals or pulses. More specifically, the invention in its preferred form comprises the measurement of the thickness or other property of an article or material by X-ray absorption. The absorption of the X-rays in the piece or material under test is compared with that in a standard specimen. The X-rays are produced by an intermittent or alternating voltage and are directed against the article under test. The portions transmitted through the wall of the article are detected as pulses which recur at the frequency of the power supply voltage. The size of the pulse is a measure of the intensity of the X-ray beam which is not absorbed. The present invention provides a novel method of comparing such pulses with those obtained by transmitting the X-ray beam through a standard specimen.

The invention as herein illustrated and described is used for measuring the wall thickness of a glass article as, for example, a glass jar, for determining any area or point at which the thickness is less than a prescribed minimum. An X-ray beam is transmitted through the wall of the article and the transmitted radiation applied to a detector such as a crystal of cadmium sulfide. An electrical potential is maintained across the detector and the current therethrough which varies with the X-ray intensity is an indication of the amount of X-ray absorption. A similar detector is energized by the transmitted portion of the X-ray beam passed through a standard piece of glass of the minimum permissible thickness.

The electrical pulses produced by the two detectors are compared in an electrical circuit in which the two signals are transmitted to amplifiers. The amplified signals are taken from the amplifiers, one from the plate of one amplifier and the other from the cathode of the other amplifier so that they are of opposite polarity. These signals are compared and the difference in their value is applied to a thyratron. When the difference exceeds a certain value the thyratron is fired, thereby giving a signal.

An object of the present invention is to provide a practical method of rapidly testing articles such, for example, as glass jars, which are produced in rapid succession, for determining any areas in which the thickness of the glass wall is below a prescribed limit. The wall under test must be scanned by the detector and for this purpose the article is rotated at a high speed about its axis while the X-ray beam is transmitted therethrough to the detector. As the area of the glass at any instant within the range of the detector is very small it is necessary that the X-ray voltages be applied in rapid succession to the detector so that a signal may be given when any minute portion of the glass under test is below the required limit of thickness. The present invention provides an apparatus and method by which the surface under test may be quickly scanned and any thin spot detected and a signal thereby given. Such signal may be used for operating an indicator ejector, or other device.

Referring to the accompanying drawings:

Fig. 1 is a diagrammatic view of the electrical circuits in an apparatus for practicing my invention.

Fig. 2 is a diagrammatic view showing an X-ray tube and the method of applying the X-ray beam to an article under test.

Fig. 3 is a fragmentary view showing means for rotating a jar during the scanning operation.

Referring to Fig. 2, an X-ray tube 10 is energized by an intermittent voltage taken from the mains 11 and 12 and transmitted through a transformer 13 to the X-ray tube. A battery 14 supplies current to the cathode. The X-ray beam 15 is projected from the plate 16. An article 17 under test, herein shown as a glass jar, is placed in the path of the X-ray beam 15. A detector 18 is positioned within the jar 17 in the path of the radiation transmitted through the wall of the jar. This detector may be of the type comprising a crystal of cadmium sulfide.

As shown in Fig. 3 the detector 18 is suspended within the jar from a support 20. The jar is placed on a pad 21 which is mounted for rotation about a vertical axis. The pad may be rotated by a power shaft 22 operating through gears 23, 24. The means for rotating the pad 21 and jar 17 may be the same as that shown, for example, in the patent of Fedorchak 2,327,629, August 24, 1943. The jar may be rotated rapidly through one or more complete rotations so that the side wall of the jar is scanned throughout its entire circumference by the portion of the X-ray beam which is transmitted to the detector 18. The jar may be moved vertically during the scanning, if desired, to increase the scanned area. A second detector 25 is placed in the path of the X-ray beam to receive radiation transmitted through a standard gauge or piece of glass 26 of the same thickness as said minimum thickness permissible in the article under test. The detectors or crystals 25 and 18 are preferably alike so that the electrical signals therefrom are equal when energized by X-radiation of equal intensity.

The signals from the detector cells 18 and 25 are transmitted over like channels 30 and 31 (Fig. 1) comprising identical linear high speed amplifier units. These units may be, for example, such as are now supplied to the trade by the General Electric Company. The signals from these units are transmitted over leads 36 and 37 to a balance indicator circuit which includes amplifiers 38 and 39. Each of these amplifiers is provided with direct feedback such that their gain is essential unity. The amplified signal from the tube 39 is taken from the plate 40 and the signal from the tube 38 is taken from the cathode 41 so that said signals are opposite in polarity. These opposed signals are compared in a resistor network comprising resistors 42 and 43, said network centered at the point 44. The resistors are so adjusted that for equal inputs they cancel each other so that the signal at the point 44 is zero.

Any signal at the point 44, due to a difference in the opposed input signals, is coupled through a capacitance 45 to a cathode follower or amplifier 48. The amplified signal is applied to the grid 49 of a thyratron 50. The thyratron is connected to yield an output pulse whenever its grid becomes more positive than a threshold value established by its cathode voltage. This voltage may be varied by adjustment of a variable resistor 51. With this arrangement when the input at the point 44 is enough greater from one tube than the other the thyratron will fire and produce an output pulse which may be used to actuate any desired indicating, recording or selecting equipment. As shown this output from the thyratron energizes a relay coil 52 which closes the circuit 53 for an ejector or other device.

In practice the voltage for the X-ray tube (Fig. 2) may be taken, for example, from a 60 cycle commercial line 11, 12 so that the pulses transmitted from the detectors 18 and 25 are repeated at intervals of 1/60 of a second. When the wall thickness of any portion of the article 17 being tested is of a thickness below the critical level the signals from the detectors will be transmitted in rapid succession to the thyratron, giving a rapid succession of measurements. Thus any thin portion of the article which is being rapidly scanned will be detected.

An inherent property of X-ray sources is their variability. Even when great care is taken to provide a uniform supply voltage the output intensity varies from pulse to pulse. The usual scheme for avoiding this trouble is to average results over many pulses. An important advantage of the present invention is that it provides a scheme of comparison by which a judgement of the wall thickness of the article under test can be based on a single pulse, thereby permitting a rapid scanning.

This scheme is not limited to the use of X-rays. In general, any form of radiation may be employed which gives a repeated electrical signal in which the amplitude is a measure or indication of the wall thickness or other characteristic of the article or material under test. For example, an ultraviolet lamp or source of radiation which is partly absorbed by the glass, could be substituted for the X-ray tube 10.

Modifications may be resorted to within the spirit and scope of my invention.

I claim:

1. Electrical apparatus comprising two amplifiers substantially alike and each comprising an anode, a cathode and a control grid, means for applying a series of electrical pulses in succession transmitted over one circuit directly to the grid of one amplifier, means for applying a similar series of electrical pulses transmitted over a separate circuit directly to the grid of the other amplifier, means for generating said pulses independently of said amplifiers, means for transmitting the amplified pulses of one series from the plate of one amplifier and the amplified pulses of the other series from the cathode of the other amplifier to a common point in the circuit, thereby opposing the amplified pulses and producing a resultant pulse of a value determined by the difference in value of the opposed pulses, a third amplifier, means for transmitting the said resultant pulse to said third amplifier, and a thyratron connected to receive the amplified signal from said third amplifier.

2. Apparatus for testing the wall thickness of a glass article, which apparatus comprises an X-ray tube, means for applying alternating voltage to the tube and thereby generating an intermittent X-ray beam, means for supporting the article in the path of the beam, a detector positioned in the path of the transmitted intermittent radiation, a piece of glass of standard thickness positioned in the path of the X-ray beam, a second detector in the path of the intermittent radiation transmitted through the said piece of standard thickness, amplifiers each comprising a cathode, a plate and a control grid, means for applying intermittent electrical pulses from the detectors to the grids of said amplifiers, a resistance network connected to the plate and cathode respectively of the amplifiers and through which pulses of opposite polarity are transmitted to a point in said network, whereby resultant pulses are produced of a value determined by the difference in value of the opposed pulses, an amplifier tube, a coupling through which said resultant pulses are applied to the grid of said tube, and a thyratron connected to receive the amplified signal from said tube.

3. The apparatus defined in claim 2, the said substance under test comprising a hollow glass article, and means for rotating the article and thereby causing that portion of the X-ray beam intercepted by the detector to scan the wall surface of said article.

4. The method which comprises applying an alternating voltage to an X-ray tube and thereby producing an intermittent X-ray beam, positioning a hollow glass container in the path of the beam, positioning a detector within the container and causing the detector to be energized intermittently by radiation transmitted thereto through the container wall and thereby producing electrical pulses of a value variable with and corresponding to the degree of absorption of the radiation in its passage through the wall of the container, energizing a second detector by radiation transmitted through a glass of standard thickness positioned in the path of the X-ray beam, applying the electrical pulses from said detectors to the grids respectively of amplifier tubes each comprising a cathode, a control grid and a plate, applying the voltages of the plate of one of said tubes and the cathode of the other tube through a network of resistance to a common point, capacitively connecting a third amplifier tube to receive the pulses from said point, and applying the output from said third tube to the grid of a thyratron and causing the latter to fire when the signal at said common point exceeds a predetermined value.

5. An apparatus for testing and comparing the magnitude of one substance with that of a standard substance, said apparatus comprising means for producing an intermittent X-ray beam propagating X-ray pulses in rapid succession, means for supporting the substances under test in the path of said beam and scanning said substance with the pulsating radiation and thereby causing a portion of the X-radiation to be absorbed by the substance, a dectector positioned in the path of the transmitted radiation, said standard substance being positioned in the path of the pulsating X-ray beam, a second detector positioned in the path of the radiation transmitted through the standard substance, means providing separate and independent circuits containing said detectors respectively and over each of which a series of electrical pulses is transmitted to a point of comparison, the pulses of one series being paired with those of the other and with the two series in phase and of opposite polarity at said point of comparison and thereby providing means for comparing electrical pulses produced in said detectors by the transmitted radiation and producing by the said comparison a resultant electrical pulse of a value corresponding to the difference in value between said compared pulses, and means for producing a signal when said difference in value exceeds a predetermined limit.

References Cited in the file of this patent

UNITED STATES PATENTS

| Number | Name | Date |
| --- | --- | --- |
| 2,271,876 | Seeley | Feb. 3, 1942 |
| 2,289,737 | Sorkin | July 14, 1942 |
| 2,427,319 | Weathers | Sept. 9, 1947 |
| 2,431,510 | Salinger | Nov. 25, 1947 |
| 2,490,011 | Bird | Dec. 6, 1949 |
| 2,547,324 | Hurley | Apr. 3, 1951 |
| 2,549,402 | Vossberg | Apr. 17, 1951 |
| 2,593,616 | Schroeder et al. | Apr. 22, 1952 |
| 2,594,514 | Sweet | Apr. 29, 1952 |
| 2,607,902 | Townsend | Aug. 19, 1952 |
| 2,631,198 | Parisoe | Mar. 10, 1953 |
| 2,647,214 | Penney et al. | July 28, 1953 |
| 2,678,399 | Fay | May 11, 1954 |
| 2,680,160 | Yaeger | June 1, 1954 |
| 2,698,392 | Herman | Dec. 28, 1954 |
| 2,763,784 | Webster | Sept. 18, 1956 |